United States Patent
Toda et al.

(10) Patent No.: US 7,530,757 B2
(45) Date of Patent: May 12, 2009

(54) ROTOR COUPLING HAVING INSULATED STRUCTURE

(75) Inventors: Hideyuki Toda, Takasago (JP); Haruo Ishisaka, Takasago (JP); Yoshiyuki Morii, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 154 days.

(21) Appl. No.: 10/227,312

(22) Filed: Aug. 26, 2002

(65) Prior Publication Data
US 2003/0052557 A1 Mar. 20, 2003

(30) Foreign Application Priority Data
Aug. 27, 2001 (JP) .............................. 2001-256713

(51) Int. Cl.
*F16D 1/02* (2006.01)
*B63H 23/34* (2006.01)

(52) U.S. Cl. .................... 403/23; 403/335; 403/337; 464/900

(58) Field of Classification Search ............. 403/23, 403/335–338, 1; 277/592; 464/29, 900
See application file for complete search history.

(56) References Cited

U.S. PATENT DOCUMENTS

| | | | |
|---|---|---|---|
| 2,158,182 A | | 5/1939 | Goddard |
| 2,289,620 A | | 7/1942 | Bernstein |
| 2,435,731 A | * | 2/1948 | Anderson .................. 403/337 |
| 2,449,654 A | * | 9/1948 | Jessop ....................... 464/900 |
| 3,138,226 A | * | 6/1964 | Howe ........................ 403/336 |
| 3,862,771 A | * | 1/1975 | Schwarz ..................... 285/54 |
| 4,083,639 A | * | 4/1978 | Terry ......................... 403/336 |
| 4,407,602 A | * | 10/1983 | Terry, Jr. ................... 403/336 |
| 4,755,904 A | * | 7/1988 | Brick ......................... 361/117 |
| 5,609,018 A | | 3/1997 | Brem et al. |

FOREIGN PATENT DOCUMENTS

| | | |
|---|---|---|
| CA | 1 194 704 | 10/1985 |
| JP | 60-23627 | 2/1985 |
| JP | 61-130616 | 6/1986 |
| JP | 61238592 A * | 10/1986 |
| JP | 62119810 A * | 6/1987 |
| JP | 2001-185747 | 7/2001 |

* cited by examiner

*Primary Examiner*—Daniel P Stodola
*Assistant Examiner*—Ernesto Garcia
(74) *Attorney, Agent, or Firm*—Oblon, Spivak, McClelland, Maier & Neustadt, P.C.

(57) ABSTRACT

A rotor coupling having insulated structure which can assuredly prevent galvanic corrosion of beating members, rotors and the like which is caused by shaft voltage, is provided in a shaft system that requires insulation. A generator is disposed in between a steam turbine and a gas turbine or a rotating machinery such as another steam turbine. The rotor coupling having insulated structure is employed in power generating equipment in which a generator is disposed in between a steam turbine and a gas turbine or a rotating machinery such as another steam turbine, a generator rotor and a rotating machinery rotor are connected, a first grounding electrode is provided to the steam turbine rotor, and a second grounding electrode is provided to the generator rotor, wherein both the rotors between the generator and the steam turbine are connected in an electrically insulated state.

3 Claims, 8 Drawing Sheets

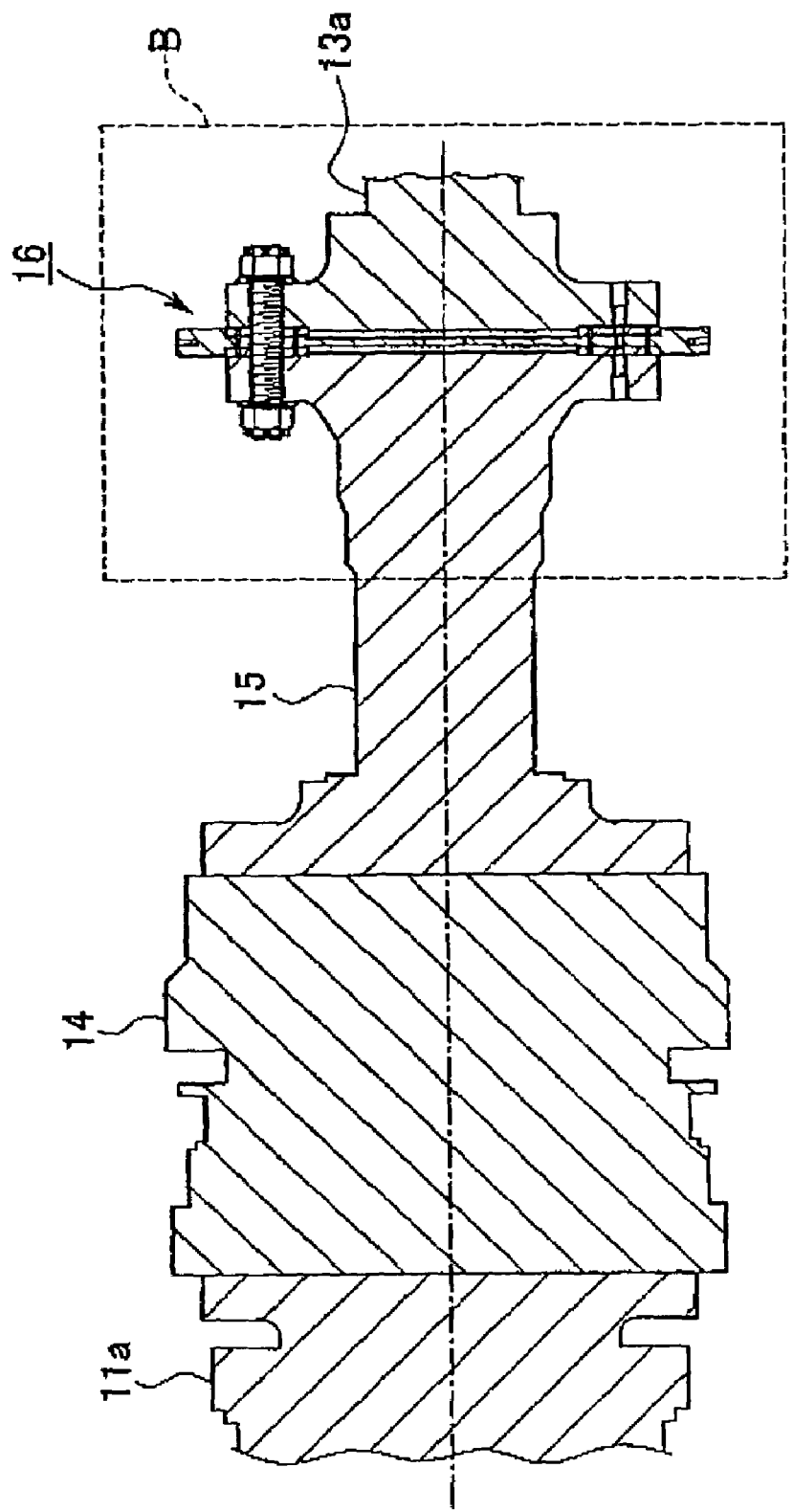

ROTOR COUPLING HAVING INSULATED STRUCTURE

BACKGROUND OF THE INVENTION

1. Field of the Invention

The present invention relates to a rotor coupling having insulated structure that is preferably employed in power generating equipment in which a generator is disposed in between a steam turbine and a gas turbine or a rotating machinery such as another steam turbine. More specifically, the present invention relates to a rotor coupling having insulated structure that is designed to stop galvanic corrosion of the rotor, bearing members and the like which occurs due to the generation of shaft voltage.

2. Description of the Related Art

An example of conventional power generating equipment will be explained with reference to FIG. 8. In this figure, 1 is a steam turbine, 2 is a generator, and 3 is a gas turbine or a rotating machinery such as another steam turbine (the following explanation employs a gas turbine as an example of this rotating machinery, however the same explanation applies to the case where another steam turbine is employed in place of the gas turbine). A rotor 1a of the steam turbine 1 and a rotor 2a of the generator 2 are connected to the same shaft via a clutch 5. The rotor 2a of the generator 2 and a rotor 3a of the gas turbine 3 are also connected to the same shaft by a rotor coupling 6. In addition, each rotor 1a, 2a, 3a is supported by bearing members 7 in a manner so as to permit rotation.

By employing a design in which the generator 2 is disposed in between the steam turbine 1 and gas turbine 3 in this way, it is possible to disengage between the steam turbine 1 and gas turbine 3. As a result, the stream turbine 1 and gas turbine 3 can be disengaged using the clutch 5, as compared to a design in which the generator, steam turbine, and gas turbine (or the rotating machinery such as another steam turbine) are disposed in sequence. Thus, greater flexibility in operation can be achieved.

In the arrangement shown in FIG. 8, the shaft voltage is theoretically different between the shaft on the driver side and the opposite side of the generator 2. For this reason, when these are linked (via a grounded earth grid, for example), a large amount of current flows to each of the rotors 2a, 1a, 3a in this loop.

When the shaft voltage of this sort exceeds a limit value, the insulation between the rotors 1a, 3a and each bearing member 7 is disrupted, allowing discharge to occur. As a result, journals and outer surface of ground devices of the rotors 1a, 3a and bearings of the bearing members 7 are damaged by the effects of galvanic corrosion.

As shown in FIG. 8, a preventative measure for this type of damage calls for releasing shaft current by providing a grounding electrode 9a in between the steam turbine 1 and generator 2.

Normally, by grounding one point in a continuous conductor like each rotors 1a, 2a, 3a, it is possible to achieve the same potential at all sites. However, in a shaft system having a design in which the generator 2 is disposed in between the steam turbine 1 and gas turbine 3, even if one point of the rotor 1a, 2a, 3a is grounded, the potential at a point away from this grounded point can be high. Accordingly, simply employing a grounding electrode 9a has not been a sufficient countermeasure.

Therefore, a strategy was investigated for preventing the potential at the rotor 3a, which is away from the grounding electrode 9a, from becoming high by providing another grounding electrode 9b in between the gas turbine 3 and generator 2 as shown in FIG. 8. However, when two grounding points are employed in this way, a large amount of circular loop current (mainly an alternating current component generated at the generator 2) circulates as shown by arrow c in the figure if separate earth grids are not provided (if two grounding points are connected, for example), and the current gives to damage to the rotors 1a, 3a and bearing members 7 from the effects of galvanic corrosion due to the shaft voltage as explained above.

Accordingly, grounding electrodes 9a, 9b alone were not a sufficient countermeasure to the shaft voltage, so that a new approach has been greatly desired.

SUMMARY OF THE INVENTION

The present invention was conceived in view of the above-described circumstances and has as its objective the provision a rotor coupling having insulated structure that can assuredly prevent galvanic corrosion of rotors, bearing members and the like caused by shaft voltage in a shaft system that requires insulation and a design in which a generator is disposed in between a steam turbine and a gas turbine or a rotating machinery such as another steam turbine.

The present invention employs the following means to resolve the above-described problems.

Namely, the rotor coupling having insulated structure according to the first aspect of the present invention is characterized in being employed in power generating equipment in which a generator is disposed in between a steam turbine and a gas turbine or a rotating machinery such as another steam turbine, a generator rotor and a rotating machinery rotor are connected, a first grounding electrode is provided to the steam turbine rotor, and a second grounding electrode is provided to the generator rotor, wherein both the rotors between tee generator and the steam turbine are connected in an electrically insulated state.

In the rotor coupling having insulated structure according to the first aspect of the present invention, by contacting a ground via the first and second grounding electrodes, the potential of each rotor can be reduced. Furthermore, in this rotor coupling having insulated structure, it is possible to stop the flow of current from the generator rotor to the first grounding electrode. Thus it is possible to offer a design that is an effective countermeasure to the shaft voltage, and therefore, it can prevent galvanic corrosion of bearing members, rotors and the like which is caused by the shaft voltage.

The rotor coupling having insulated structure according to the second aspect of the present invention is characterized in that there is provided in the rotor coupling having insulated structure according to the first aspect: a generator-side flange provided on a side of the generator rotor; a steam turbine-side flange provided on a side of the steam turbine rotor; an inter-flange insulating member that is held in between the generator-side flange and the steam turbine-side flange; and a connecting bolt for tightening the area between the generator-side flange and the steam turbine-side flange with the inter-flange insulating member held therebetween; wherein insulating members composed of an alumina flame coated surface or BAKELITE™ (phenolic resin)material are provided to the inter-flange insulating member and the connecting bolt for interrupting the galvanization between the generator-side flange and the steam turbine-side flange.

In the rotor coupling having insulated structure according to the second aspect described above, the galvanization between the generator-side flange and the steam turbine-side flange can be interrupted by the insulating parts. As a result, current flowing from the generator rotor to the first grounding electrode can be prevented.

The rotor coupling having insulated structure according to the third aspect of the present invention is characterized in that the alumina flame coated surface is coated with silicon resin in the rotor coupling having insulated structure according to the second aspect.

In the rotor coupling having insulated structure according to the third aspect described above, very fine pores generated in the alumina layer of the alumina flame coated layer can be covered with silicon resin, improving the electrical insulating effect of the alumina flame coated layer.

The rotor coupling having insulated structure according to the fourth aspect of the present invention is characterized in that the alumina flame coated surface is provided via an undercoat consisting of nickel chrome in the rotor coupling having insulated structure according to the second or third aspect.

In the rotor coupling having insulated structure according to the fourth aspect as described above, it is possible to improve the adherence to the surface where alumina flame coating is performed by performing the alumina flame coating on top of an undercoat consisting of nickel chrome. Thus, peeling of the alumina flame coating does not readily occur.

BRIEF DESCRIPTION OF THE DRAWINGS

FIG. 2 is a vertical cross-sectional view of part A in FIG. 1 showing an essential element of the power generating equipment.

PREFERRED EMBODIMENTS OF THE PRESENT INVENTION

A first embodiment of the rotor coupling having insulated structure of the present invention will now be explained with reference to the accompanying figures. However, the present invention is of course not limited thereto.

Figure 1:
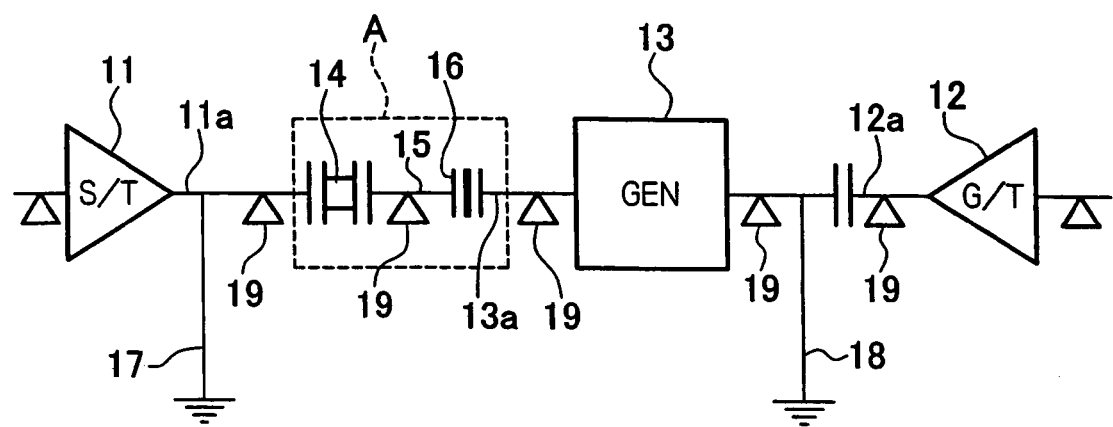
FIG. 1 is an explanatory figure showing the rough design of a power generating equipment provided with an embodiment of the rotor coupling having insulated structure of the present invention.
Figure 3:
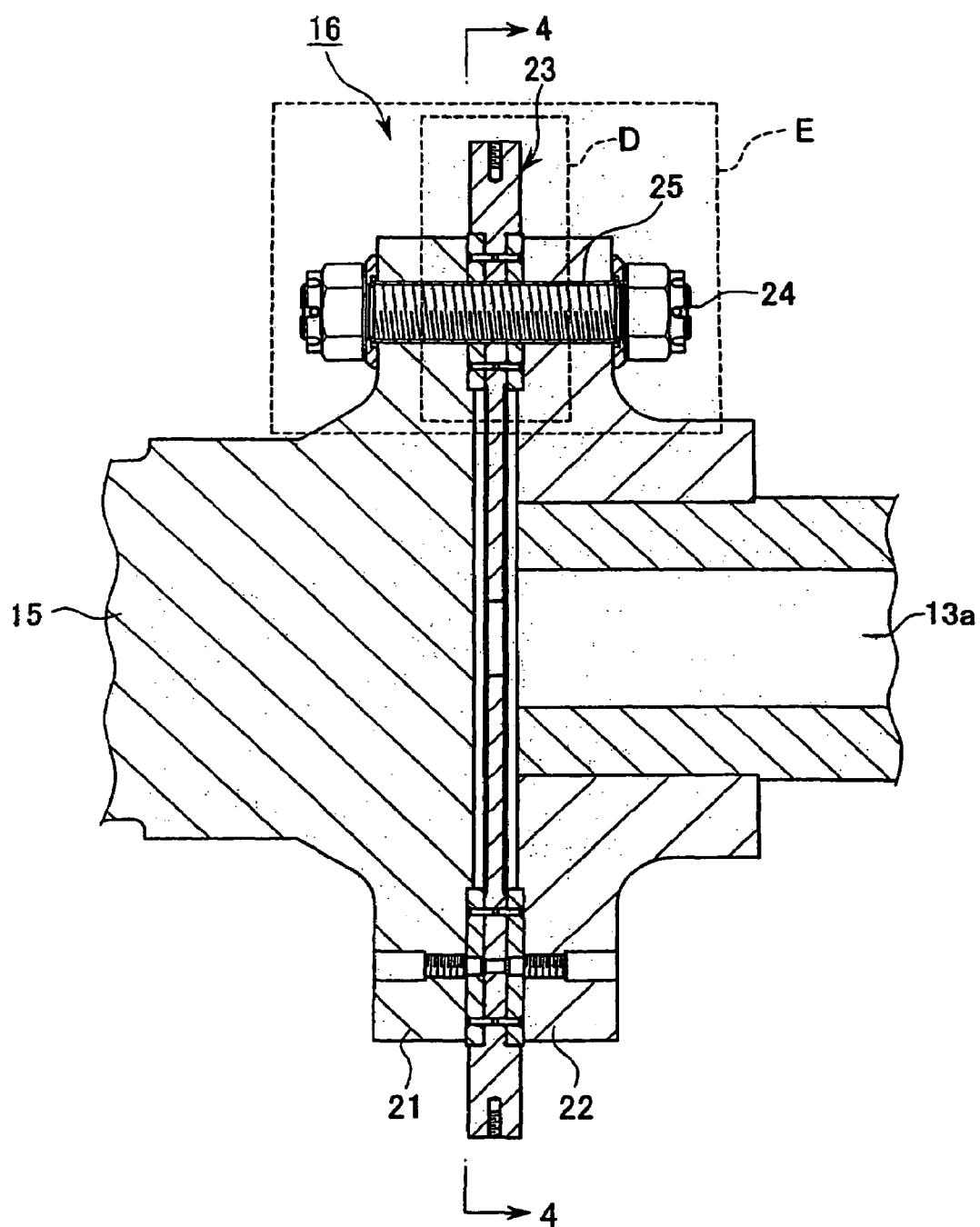
FIG. 3 is an enlarged cross-sectional view of part B in FIG. 2 showing the rotor coupling having insulated structure provided to the essential element in the power generating equipment.
Figure 4:
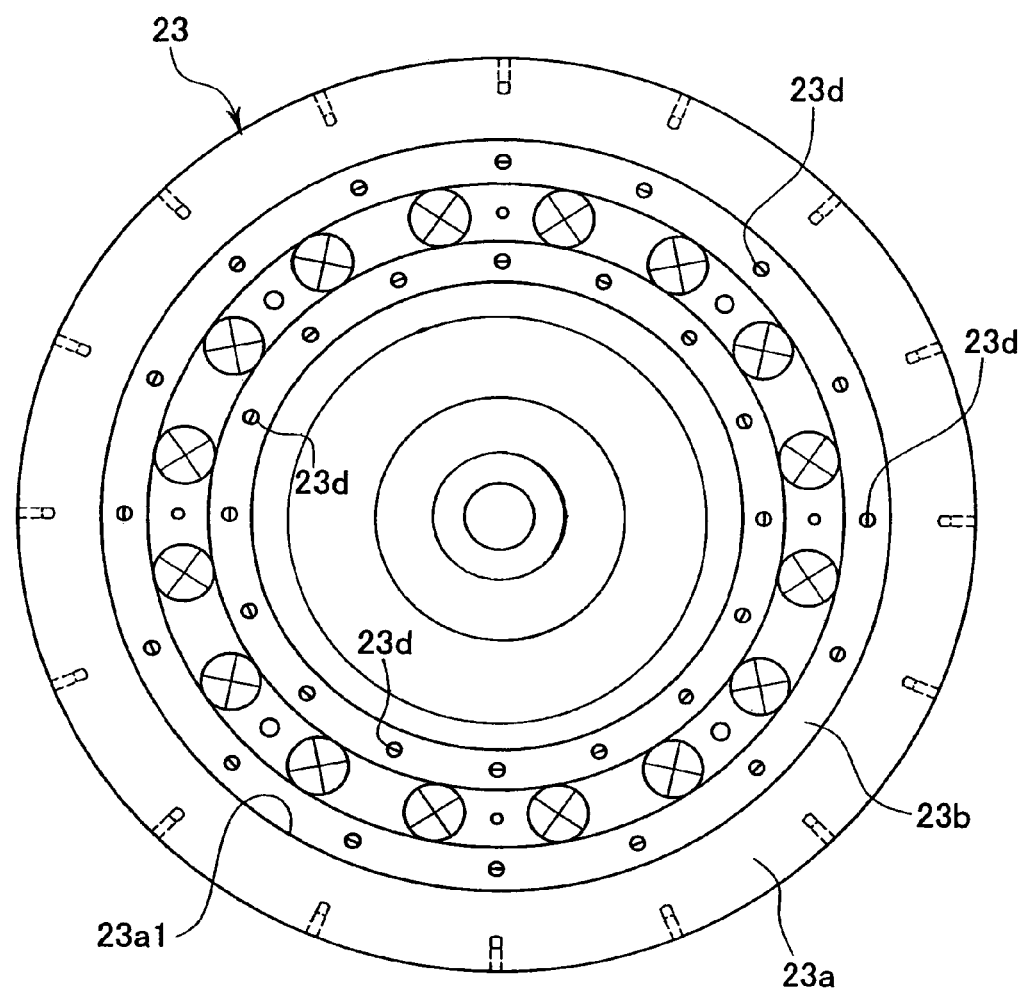
FIG. 4 is a view of the rotor coupling having insulated structure as seen along arrow 4-4 in FIG. 3.
Figure 5:
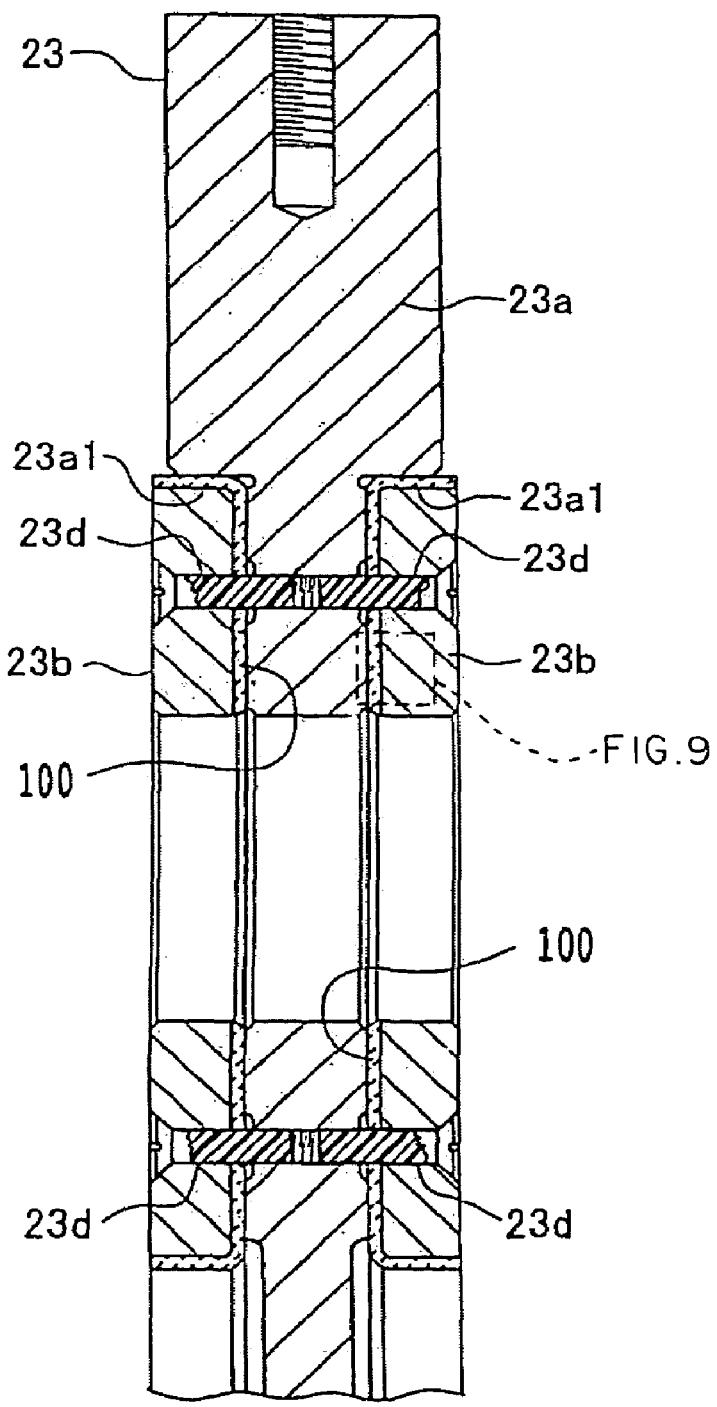
FIG. 5 is an enlarged view of section D in FIG. 3 showing the rotor coupling having insulated structure.
Figure 6:
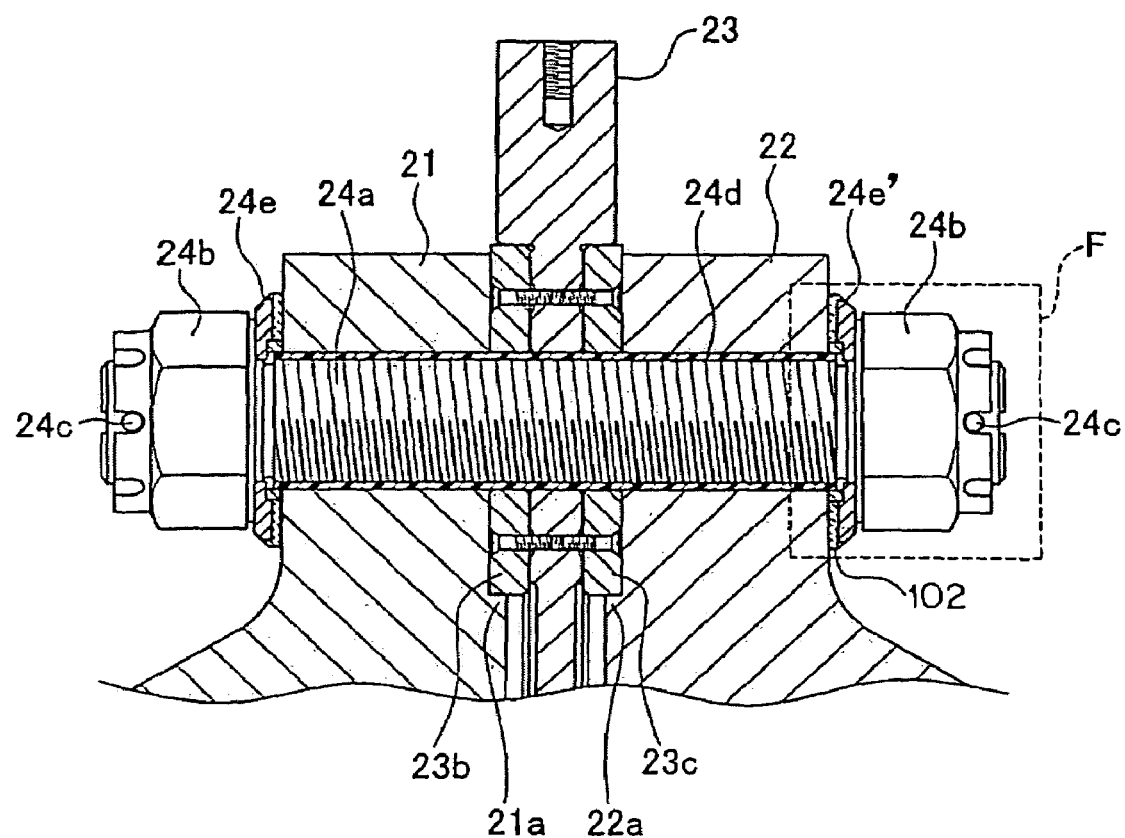
FIG. 6 is an enlarged view of section E in FIG. 3 showing the rotor coupling having insulated structure.
Figure 7:
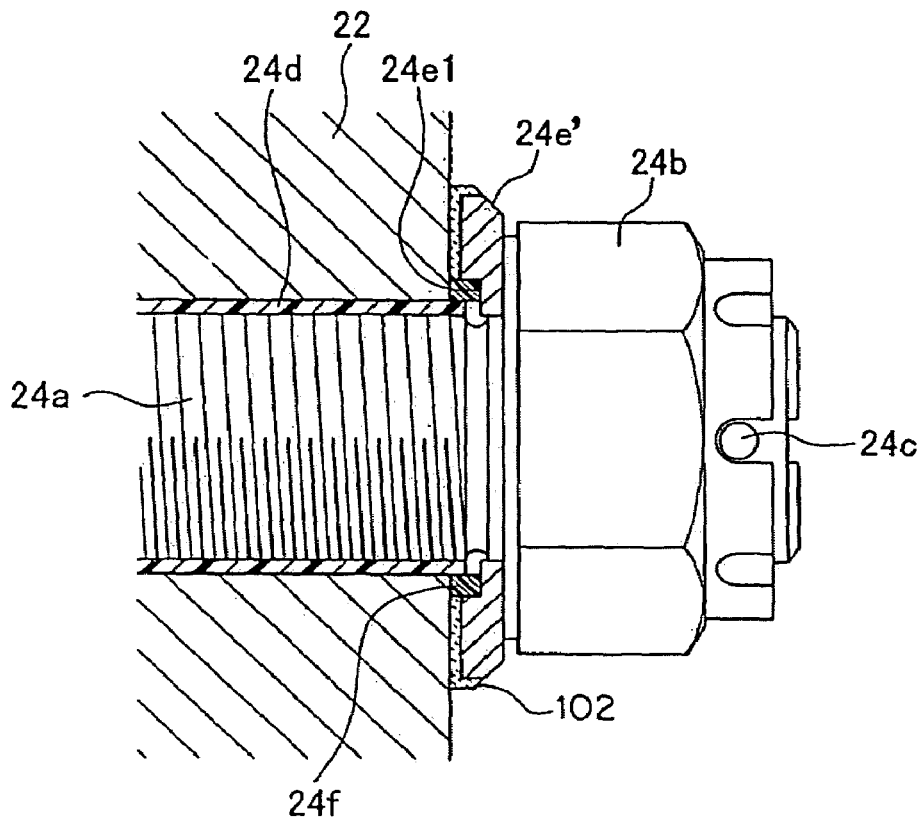
FIG. 7 is an enlarged view of section F in FIG. 6 showing the rotor coupling having insulated structure.
Figure 8:
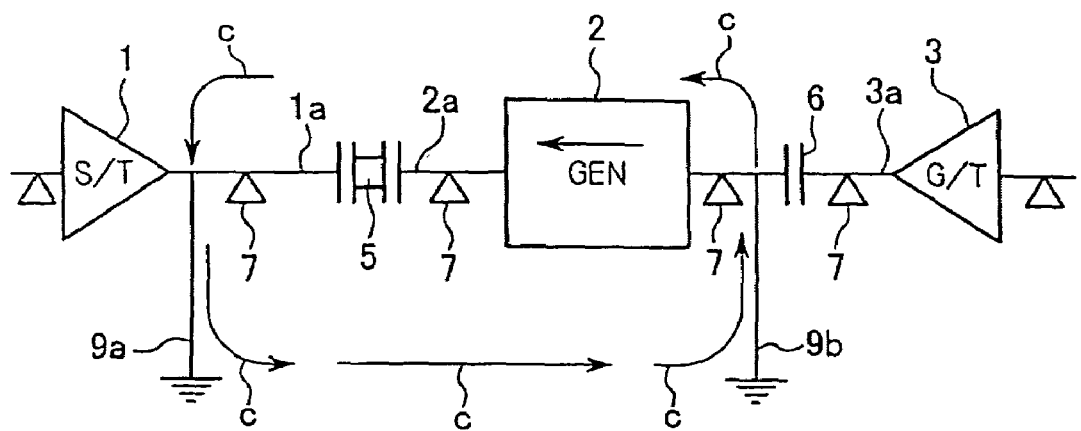
FIG. 8 is an explanatory view showing the rough structure of the power generating equipment provided with a conventional insulating structure.

FIG. 1 is an explanatory figure showing the rough design of a power generating equipment provided with the first embodiment of the rotor coupling having insulated structure of the present invention. FIG. 2 is a vertical cross-sectional view of part A in FIG. 1 showing an essential element of the power generating equipment. FIG. 3 is an enlarged cross-sectional view of part B in FIG. 2 showing the rotor coupling having insulated structure provided to the essential element in the power generating equipment. FIG. 4 is a view of the rotor coupling having insulated structure as seen along arrow C-C in FIG. 3. FIG. 5 is an enlarged cross-sectional view of part D in FIG. 3 showing the rotor coupling having insulated structure. FIG. 6 is an enlarged cross-sectional view of part E in FIG. 3 showing the rotor coupling having insulated structure. Furthermore, FIG. 7 is an enlarged cross-sectional view of part F in FIG. 6 showing the rotor coupling having insulated structure.

As shown in FIG. 1, the power generating equipment of the present invention has a rough design in which a generator 13 is disposed in between a steam turbine 11 and a gas turbine 12 (rotating machinery), the area between a rotor 13a of the generator 13 and a rotor 11a of the steam turbine 11 are connected via a clutch 14 and a jack shaft 15, and the rotor 13a of the generator 13 and a rotor 12a of the gas turbine 12 are connected.

Figure 10:
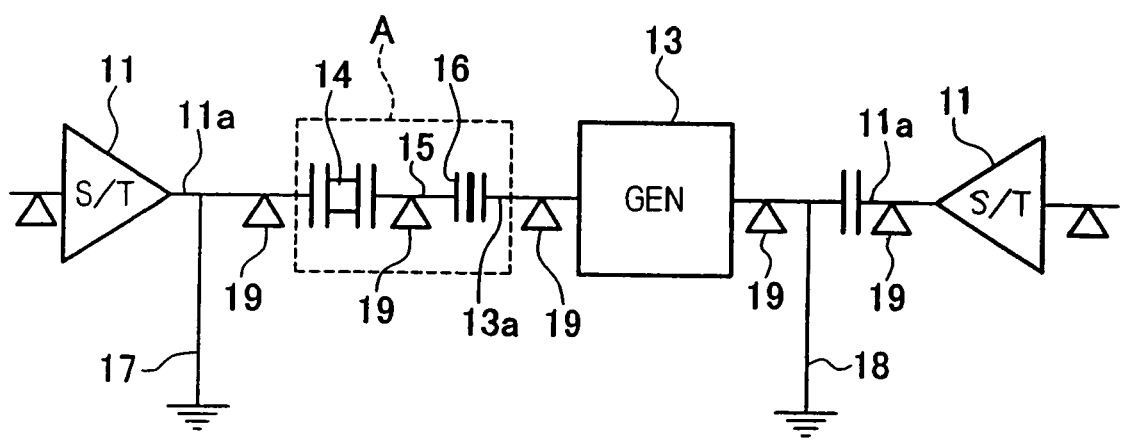
FIG. 10 is an explanatory view showing the rough structure of the power generating equipment provided with another embodiment of the rotor coupling having the insulated structure of the present invention.

Note that this embodiment is explained using the gas turbine 12 as one example of the aforementioned rotating machinery. However, it is also acceptable to provide other rotating machinery such as another steam turbine shown in FIG. 10 in place of this gas turbine 12.

As shown in FIGS. 1 and 2, the power generating equipment of this embodiment employs a design in which both the rotors 13a and 11a of the generator 13 and steam turbine 11 are connected via a rotor coupling having insulated structure 16 which links these rotors 13a and 11a in an electrically insulated manner, a first grounding electrode 17 (an earth electrode having a brush in which a tip end thereof slides against the outer surface of the rotor 11a on the steam turbine 11 side) is provided to the rotor 11a closer to the steam turbine 11 side than the rotor coupling having insulated structure 16, and a second grounding electrode 18 (an earth electrode having a brush in which a tip end thereof slides against the outer surface of the rotor 13a on the generator 13 side) is provided to the gas turbine 12 side of the rotor 13a of the generator 13.

Note that numeric symbols 19 in FIG. 1 indicate bearing members for supporting the each of the shafts of the rotor 11a, jack shaft 15, rotor 13a, and rotor 12a, etc.

As shown in FIG. 3, the rotor coupling having insulated structure 16 is provided with a generator-side flange 22 (provided in an unitary manner to the end of the rotor 13a) which is provided to the rotor 13a side of the generator 13; a steam turbine-side flange 21 (formed in a unitary manner to one end of the jack shaft 15) provided to the jack shaft 15 which is the rotor on the rotor 11a side of the steam turbine 11; an inter-flange insulating member 23 which is held in between the generator-side flange 22 and steam turbine-side flange 21; and a connecting bolt 24 which tightens the area between the generator-side flange 22 and steam turbine-side flange 21 with the inter-flange insulating member 23 held therebetween.

Insulating parts consisting of BAKELITE™ or an alumina flame coated surface are provided respectively to the inter-flange insulating member 23 and each connecting bolt 24 to interrupt galvanization between the generator-side flange 22 and steam turbine-side flange 21. These insulating parts consisting of an alumina flame coated surface and BAKELITE™ will be explained in greater detail below.

As shown in FIGS. 4 and 5, the inter-flange insulating member 23 is provided with a spacer 23a, a pair of rings 23b that form a convex socket and spigot portion which holds the spacer 23a from either side thereof; and a plurality of screws 23d that hold these rings 23b fixed in place with respect to the spacer 23a.

The spacer 23a is a metallic circular disk for adjusting the dimensions of the space interval between the jack shaft 15 and rotor 13a. Circularly shaped concavities 23a1, are formed to either side surface of the spacer 23a as convex socket and spigot portions for the engagement of each ring 23b along the same shaft respectively.

Each ring 23b is a thin ring-shaped metallic piece, in which alumina flame coating 100 (the alumina flame coating forming the insulating portion) has been formed to one side surface and the outer peripheral surface (the portion indicated by the thick line in FIG. 5) which comes into contact with the circular concavities 23a1, 23a. Therefore, even when the rings 23b which are metallic parts are attached to the spacer 23a, it is possible to ensure an electrically insulated state between the rings 23b and spacer 23a.

Each screw 23d for fixing these rings 23b, 23c in place is a part formed of bakelite (i.e., is an insulating part), so that an electrically insulated state can be maintained between the rings 23b, 23c and spacer 23a. Furthermore, as shown in FIG. 6, the rings 23b, 23c which form these convex socket and spigot portions are designed to enable adjustment of the jack shaft 15 and rotor 13a along the same shaft by engaging in the concavities 21a, 22a formed in the flanges 21, 22 respectively.

Figure 9:
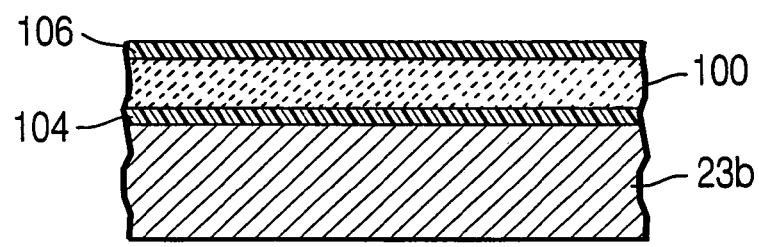
FIG. 9 is an enlarged cross-sectional view of a ring for showing an undercoat of nickel chrome and a coating of silicon.

In order to prevent peeling of the aforementioned alumina flame coated surface, an undercoat consisting of nickel chrome is first applied to the flame coating surface as denoted by the reference number 104 in FIG. 9, after which flame coating is carried out. Furthermore, since very fine pores are generated in the alumina layer so that the insulating effect would be insufficient, a coating of silicone resin is applied over the entire surface as denoted by the reference number 106 in FIG. 9 in order to achieve a complete insulating effect. For clarity of illustration, undercoatings 104 and 106 are not shown in FIG. 5. Note that while omitted from the following discussion, this same undercoating and silicone resin have been applied to each of the alumina flame coated parts in the following explanation.

As shown in FIGS. 6 and 7, each connecting bolt 24 is comprised of a bolt main body 24a, nuts 24b, cotter pins 24c, an insulating sleeve 24d, insulating washers 24e and 24e', and insulating rings 24f.

The bolt main body 24a and nuts 24b are metallic parts, and rotation of the nuts 24b are prevented by the cotter pins 24c.

The insulating sleeve 24d is a thin cylindrical part (insulating part) in which a bakelite material is wrapped around the outer periphery of the bolt main body 24a into which a spiral groove has been provided. The peripheral surface of the bolt ma body 24a comes into contact with the bolt hole of the flanges 21, 22, making it possible to prevent electrical conduction of the jack shaft 15 and rotor 13a.

The insulating washers 24e' are metallic washers in which an alumina flame coating 102 (insulating part forming an alumina flame coating) is formed to the outer peripheral surface and to the surface that comes in contact with the flanges 21, 22 with the objective of achieving electrical insulation. These insulating washers 24e are in contact with flanges 21, 22 and prevent electrical conduction between the jack shaft 15 and rotor 13a by means of this alumina flame coating.

Insulating rings 24f are ring-shaped parts (insulating parts) formed of BAKELITE™, and are designed to engage in concavities 24e1 which are formed in each insulating washer 24e'. These insulating rings 24f prevent electrical conduction between the jack shaft 15 and rotor 13a when the insulating washers 24e' and flanges 21, 22 come into contact with one another.

Accordingly, in the power generating equipment of the present invention, it is possible to reduce the potential of rotors 13a, 12a, 11a, jack shaft 15 and clutch 14 by contacting a ground via the first grounding electrode 17 and second grounding electrode 18. Furthermore, the flow of current from the rotor 13a of the generator 13 to the first grounding electrode 17 can be prevented by means of the rotor coupling having insulated structure 16.

As discussed above, the power generating equipment of the present invention employs a design in which the rotor coupling hang insulated structure 16 is provided in between the both rotors 13a, 11a of the generator 13 and steam turbine 11, the first grounding electrode 17 is provided to the rotor 11a closer to the steam turbine 11 side than the rotor coupling having insulated structure 16, and the second grounding electrode 18 is provided to the gas turbine 12 side of the rotor 13a. As a result of this design, the shaft voltage at the rotors 11a, 13a, 12a can be reduced by means of the first grounding electrode 17 and second grounding electrode 18, while the flow of current from the rotor 13a of the generator 13 to the first grounding electrode 17 can be interrupted. Thus, the present invention provides a strategy for assuredly preventing galvanic corrosion of the bearing members 19, rotors 11a, 12 and clutch 14.

Accordingly, a design can be employed in which the generator 13 is disposed in between the steam turbine 11 and gas turbine 12 without giving rise to problems caused by the shaft voltage. As a result, the stream turbine 11 and gas turbine 12 can be disengaged using the clutch 15, as compared to a design in which the generator, steam turbine, and gas turbine are disposed in sequence. Thus, it is possible to achieve a greater degree of flexibility in operation.

The rotor coupling having insulated structure 16 of this embodiment is provided with the generator-side flange 22, steam turbine-side flange 21, inter-flange insulating member 23, and connecting bolts 24; and insulating parts 25 consisting of BAKELITE™ or alumina flame coating are provided to the inter-flange insulating member 23 and connecting bolts 24. As a result of this design, it is possible to assuredly prevent the galvanization between the generator-side flange 22 and steam turbine-side flange 21. Thus, the flow of current from the rotor 13a of the generator 13 to the first grounding electrode 17 can be definitely stopped.

Furthermore, the rotor coupling having insulated structure 16 of this embodiment employs a design in which the alumina flame coated surface is coated with silicon resin. As a result of this design, there is greater assurance of the electrical insulating effect of the alumina flame coated surface.

In addition, the rotor coupling having insulated structure 16 of this embodiment employs a design in which the alumina flame coated surface is provided via an undercoating consisting of nickel chrome. As a result of this design, the adherence of the alumina flame coating to the target surface is improved, so that peeling of the alumina flame coated surface is less likely.

What is claimed is:

1. An insulated coupling structure connecting a generator rotor and a steam turbine rotor in an electrically insulated state, comprising:
   a generator-side flange provided on an end of said generator rotor,
   a steam turbine-side flange provided on an end of a shaft extending from said steam turbine rotor, an inter-flange member that is held between said generator-side flange and said steam turbine-side flange, a connecting bolt for tightening an area between said generator-side flange and said steam turbine-side flange with said inter-flange member held therebetween, wherein said inter-flange member comprises a spacer and a pair of rings which sandwich the spacer, and insulating parts each consisting of an alumina flame coated layer are respectively provided to said rings for interrupting galvanization between said generator-side flange and said steam turbine-side flange, and said rings are engaged with concavities formed in the flanges respectively, to enable adjustment of the generator rotor and the steam turbine rotor along a single axis.

2. An insulated coupling structure according to claim 1, wherein said alumina flame coated layer is provided via an undercoat comprising nickel chrome.

3. An insulated coupling structure according to claim 1, wherein a first grounding electrode is provided to the steam turbine rotor and a second grounding electrode is provided to the generator rotor.

* * * * *